US009955503B2

(12) United States Patent
Sadek et al.

(10) Patent No.: US 9,955,503 B2
(45) Date of Patent: Apr. 24, 2018

(54) CARRIER SENSE ADAPTIVE TRANSMISSION (CSAT) COMMUNICATION SCHEME DETECTION AND MITIGATION IN UNLICENSED SPECTRUM

(71) Applicant: QUALCOMM Incorporated, San Diego, CA (US)

(72) Inventors: Ahmed Kamel Sadek, San Diego, CA (US); Thomas James Christol, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/565,776

(22) Filed: Dec. 10, 2014

(65) Prior Publication Data

US 2015/0163825 A1    Jun. 11, 2015

Related U.S. Application Data

(60) Provisional application No. 61/914,498, filed on Dec. 11, 2013.

(51) Int. Cl.
| | | |
|---|---|---|
| *H04W 74/08* | (2009.01) | |
| *H04W 16/14* | (2009.01) | |
| *H04W 72/12* | (2009.01) | |

(52) U.S. Cl.
CPC ....... *H04W 74/0808* (2013.01); *H04W 16/14* (2013.01); *H04W 72/1215* (2013.01)

(58) Field of Classification Search
CPC ................................................ H04W 72/1215
See application file for complete search history.

(56) References Cited

U.S. PATENT DOCUMENTS

| 2012/0039284 A1* | 2/2012 | Barbieri ............... H04W 48/10 370/329 |
| 2013/0201884 A1* | 8/2013 | Freda .................. H04W 72/005 370/278 |

(Continued)

FOREIGN PATENT DOCUMENTS

| WO | 2012078565 A1 | 6/2012 |
| WO | 2013006988 A1 | 1/2013 |

(Continued)

OTHER PUBLICATIONS

International Search Report and Written Opinion—PCT/US2014/069668—ISA/EPO—May 15, 2015.

*Primary Examiner* — Sulaiman Nooristany
(74) *Attorney, Agent, or Firm* — Muncy, Geissler, Olds & Lowe, P.C.

(57) ABSTRACT

Systems and methods for Carrier Sense Adaptive Transmission (CSAT) communication scheme identification and mitigation in unlicensed spectrum are disclosed. The identification may comprise, for example, identifying CSAT communication based on a presence of a first signal and an absence of a second signal of a Radio Access Technology (RAT) during a period of time. The mitigation may comprise, for example, limiting transmission of at least a first signal by the RAT on a resource for a period of time associated with an adaptable duty cycle used for the CSAT communication, and transmitting a second signal by the RAT on the resource during the period of time.

30 Claims, 14 Drawing Sheets

(56) References Cited

U.S. PATENT DOCUMENTS

2013/0208587 A1* 8/2013 Bala ................. H04W 16/14
370/230
2013/0315152 A1   11/2013 Ratasuk et al.
2015/0016239 A1    1/2015 Yi et al.

FOREIGN PATENT DOCUMENTS

| WO | 2013112983 A2 | 8/2013 |
| WO | 2013113143 A1 | 8/2013 |
| WO | 2013133682 A1 | 9/2013 |

* cited by examiner

__US 9,955,503 B2__

CARRIER SENSE ADAPTIVE TRANSMISSION (CSAT) COMMUNICATION SCHEME DETECTION AND MITIGATION IN UNLICENSED SPECTRUM

CROSS-REFERENCE TO RELATED APPLICATION

The present Application for Patent claims the benefit of U.S. Provisional Application No. 61/914,498, entitled "RAT TDM COMMUNICATION SCHEME DETECTION AND MITIGATION IN UNLICENSED SPECTRUM," filed Dec. 11, 2013, assigned to the assignee hereof, and expressly incorporated herein by reference in its entirety.

INTRODUCTION

Aspects of this disclosure relate generally to telecommunications, and more particularly to interference mitigation and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided the Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

There therefore remains a need for improved co-existence communication schemes for various devices operating in the increasingly crowded unlicensed frequency spectrum.

SUMMARY

Systems and methods for Carrier Sense Adaptive Transmission (CSAT) communication scheme identification and mitigation in unlicensed spectrum are disclosed.

A method is disclosed for identifying CSAT communication for reducing interference between Radio Access Technologies (RATs). The method may comprise, for example: monitoring a first RAT for presence or absence of a first signal associated with operation of the first RAT during a period of time; monitoring the first RAT for presence or absence of a second signal associated with operation of the first RAT during the period of time; identifying CSAT communication based on a presence of the first signal and an absence of the second signal during the period of time; and generating a CSAT communication indicator based on the identification.

An apparatus for identifying CSAT communication for reducing interference between RATs is also disclosed. The apparatus may comprise, for example, a transceiver and a processor. The transceiver may be configured to monitor a first RAT for presence or absence of a first signal associated with operation of the first RAT during a period of time, and to monitor the first RAT for presence or absence of a second signal associated with operation of the first RAT during the period of time. The processor may be configured to identify CSAT communication based on a presence of the first signal and an absence of the second signal during the period of time, and to generate a CSAT communication indicator based on the identification.

Another method of CSAT communication for reducing interference between RATs is also disclosed. The method may comprise, for example: receiving signals via a resource, wherein a first RAT is used to receive the signals; identifying utilization of the resource associated with the first RAT, wherein the identification is based on the received signals; limiting transmission of at least a first signal by a second RAT on the resource for a period of time associated with an adaptable duty cycle used for the CSAT communication, wherein the limiting is based on the identified utilization of the resource; and transmitting a second signal by the second RAT on the resource during the period of time.

Another apparatus for CSAT communication for reducing interference between RATs is also disclosed. The apparatus may comprise, for example, a first transceiver, a processor, and a second transceiver. The first transceiver may be configured to receive signals via a resource, wherein a first RAT is used to receive the signals. The processor may be configured to identify utilization of the resource associated with the first RAT, wherein the identification is based on the received signals, and to limit transmission of at least a first signal by a second RAT on the resource for a period of time associated with an adaptable duty cycle used for the CSAT communication, wherein the limiting is based on the identified utilization of the resource. The second transceiver may be configured to transmit a second signal by the second RAT on the resource during the period of time.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to adapting communication on a resource by one Radio Access Technology (RAT) based on utilization of the resource by another RAT, and in particular to techniques for identification and mitigation of such resource adaption schemes (e.g., by or for a user device operating in conjunction with the resource being adapted). For example, in a scenario where an LTE device and Wi-Fi devices are operating on the same channel (e.g., in an unlicensed RF band), communication of the LTE device may be adapted to implement a co-existence Carrier Sense Adaptive Transmission (CSAT) communication scheme based on how the Wi-Fi devices utilize the channel. The LTE device may adapt, for example, a transmit duty cycle and/or transmit power that the LTE device uses for communicating on the channel based on whether the channel is lightly or heavily used by the Wi-Fi devices. Advantageously, the LTE device may be co-located with a Wi-Fi receiver (e.g., a radio) that is able to acquire information indicative of the utilization of the channel by the Wi-Fi devices. Consequently, the LTE device may readily acquire such information via an interface to the Wi-Fi receiver.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
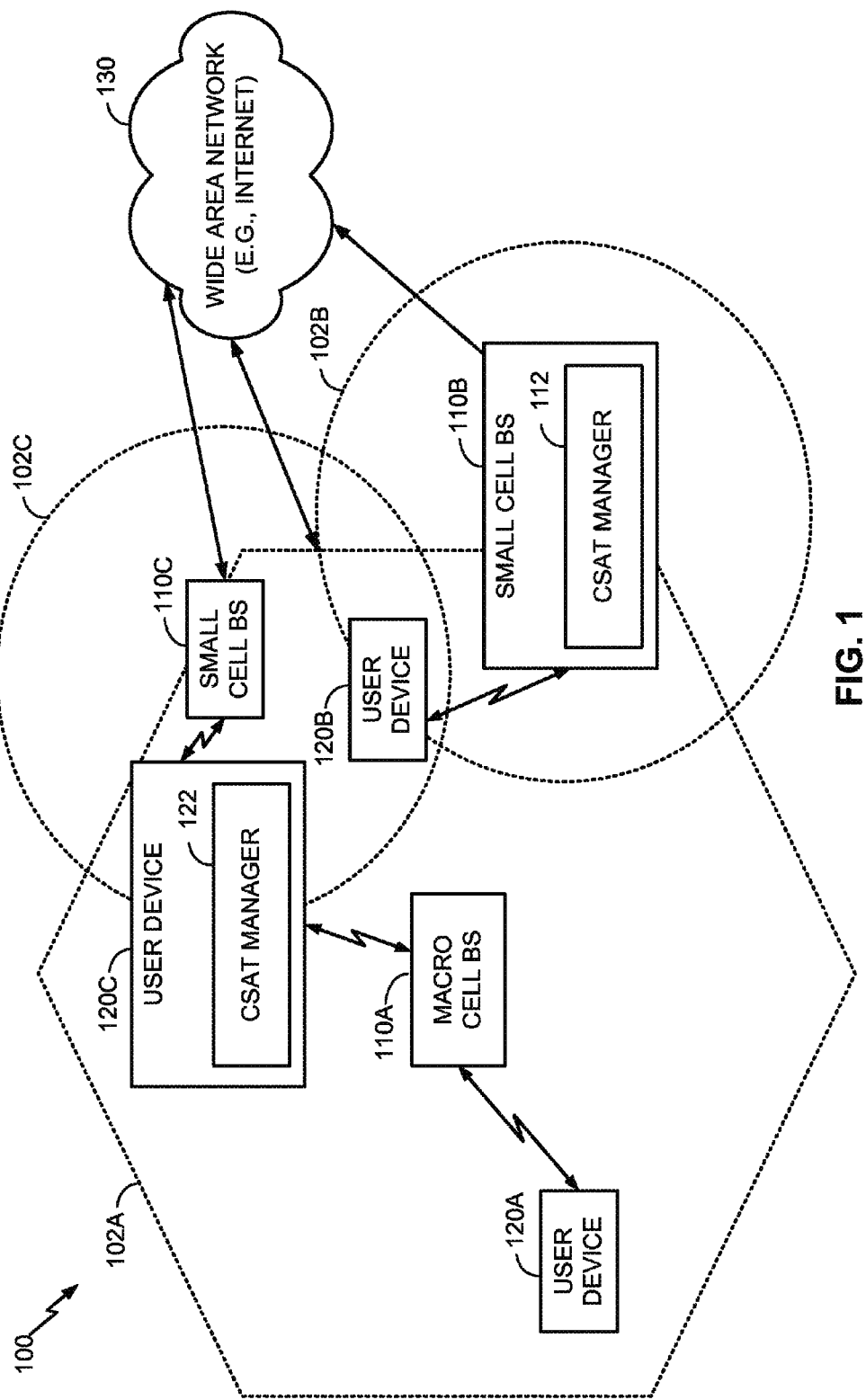
FIG. 1 illustrates an example mixed-deployment wireless communication system including macro cell base stations and small cell base stations.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the CSAT operations discussed briefly above. For example, one or more of the small cell base stations 110 may include a CSAT management module 112, while one or more of the user devices 120 may include a CSAT management module 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed commu-nication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
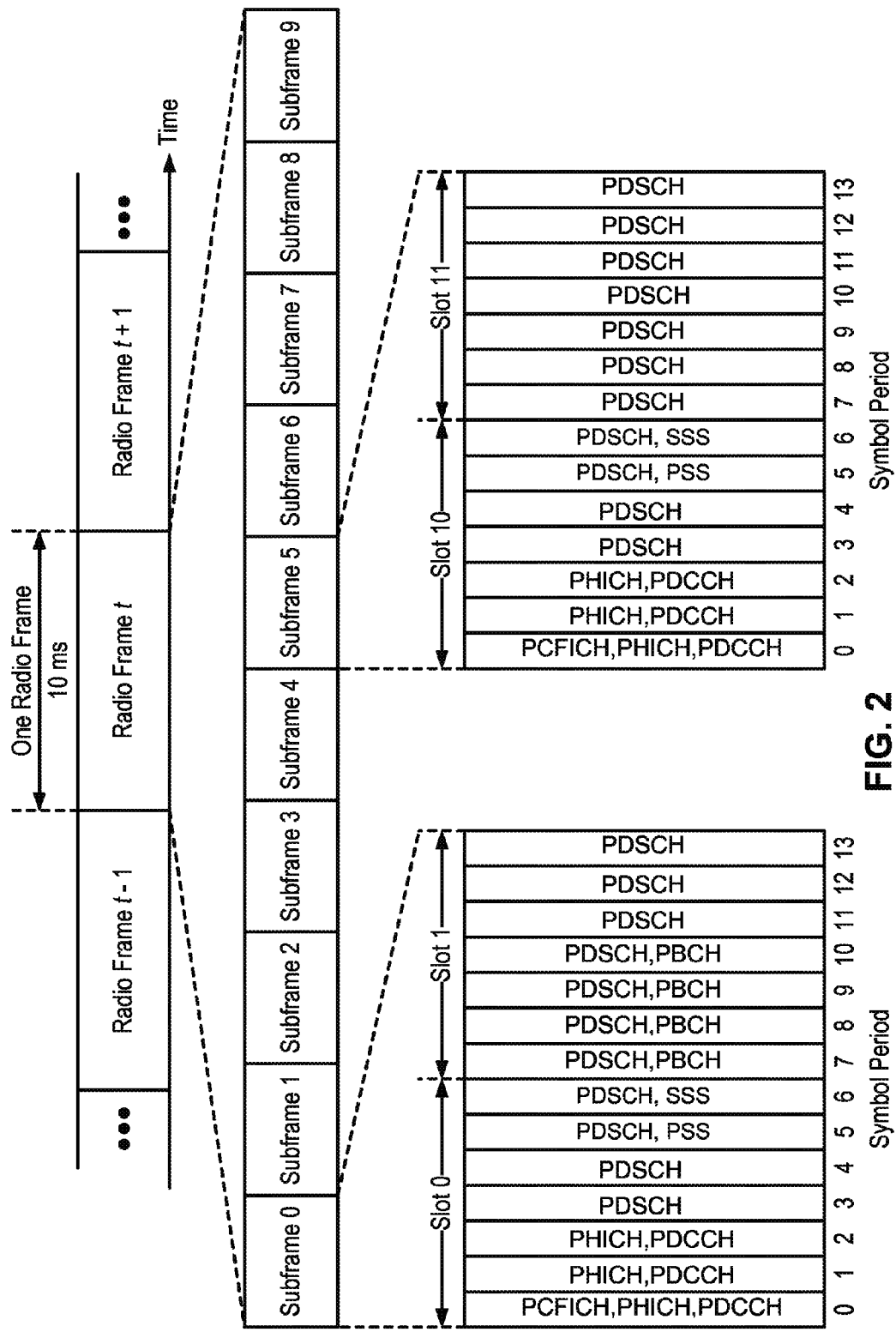
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
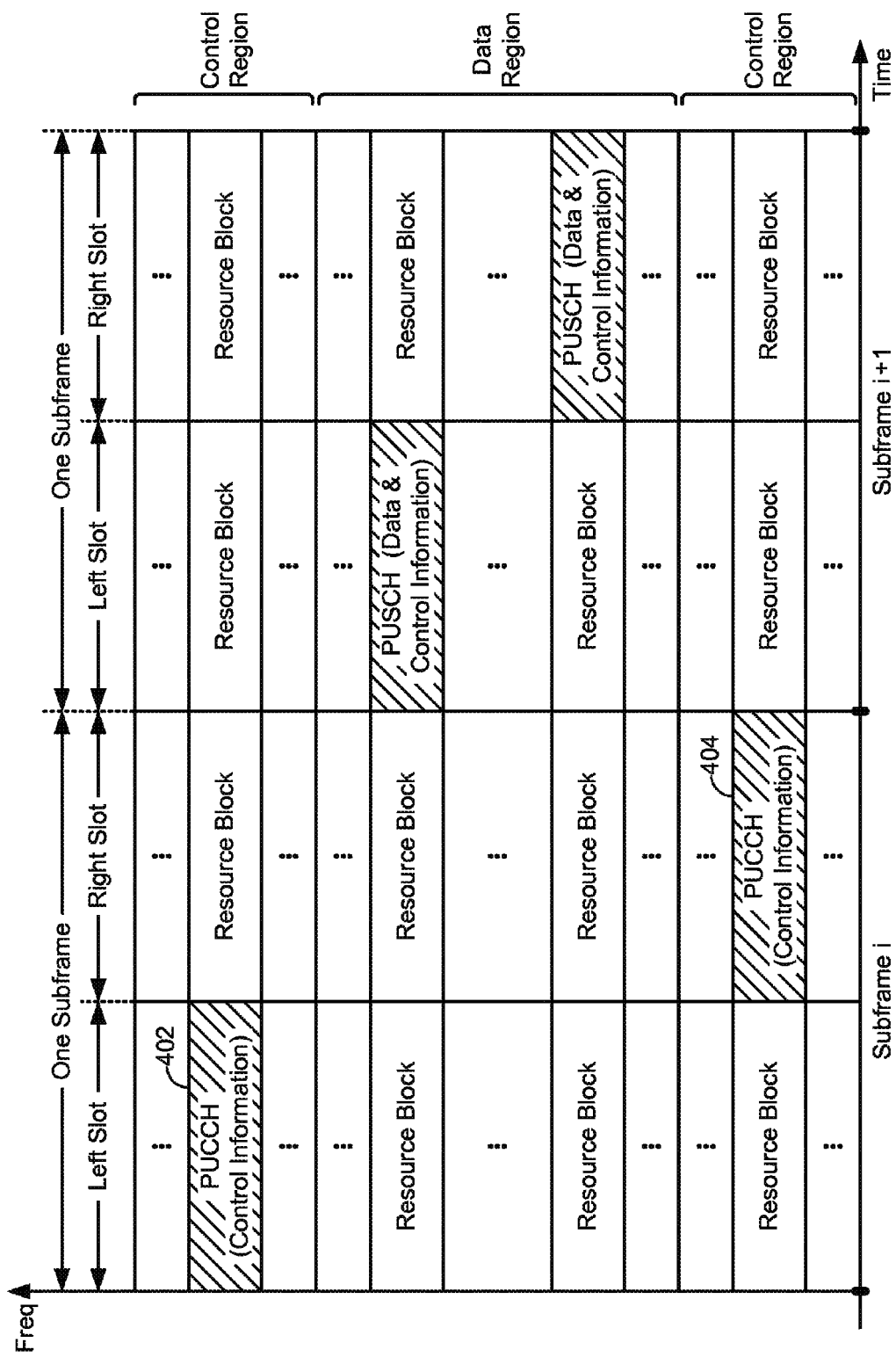
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
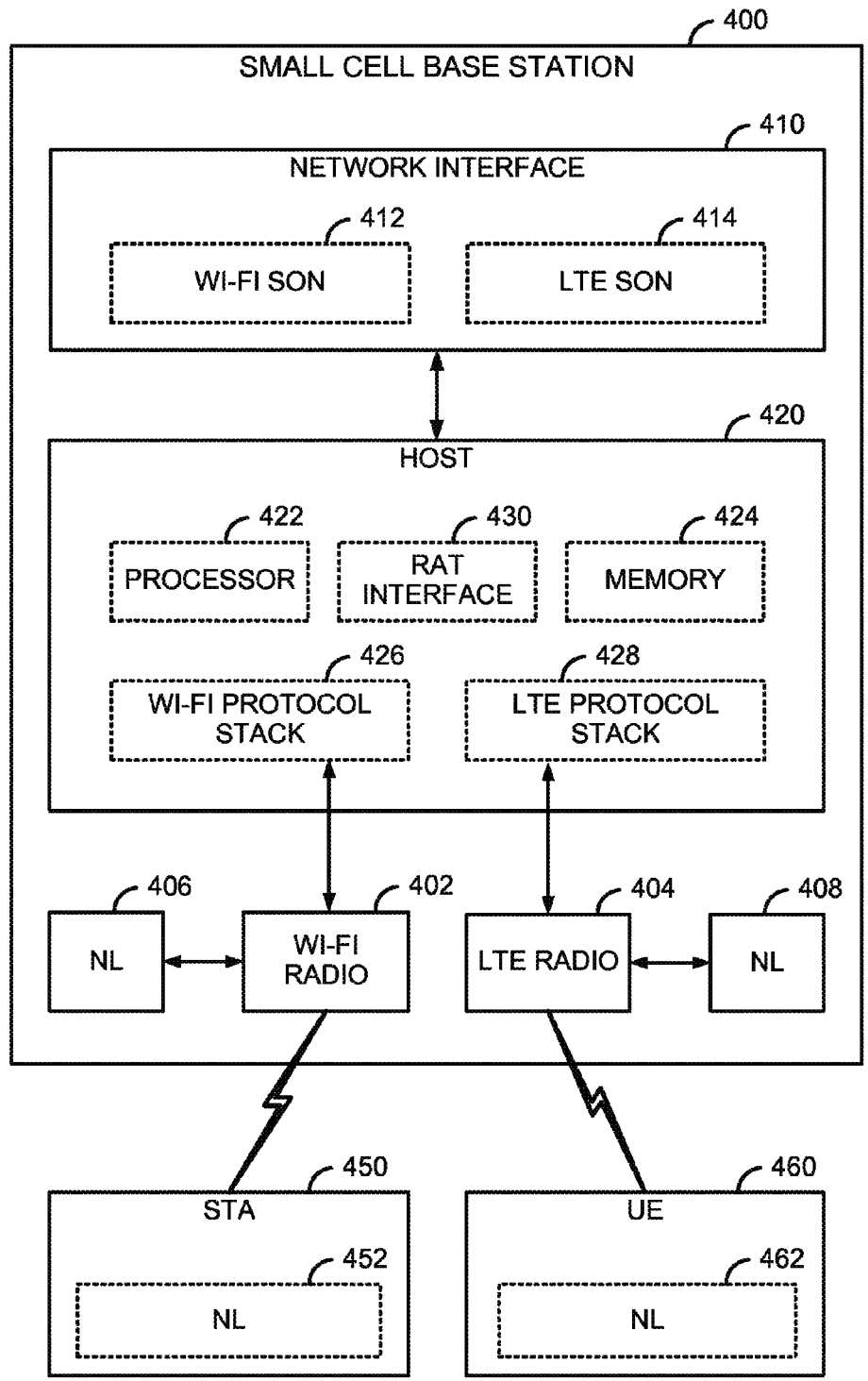
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
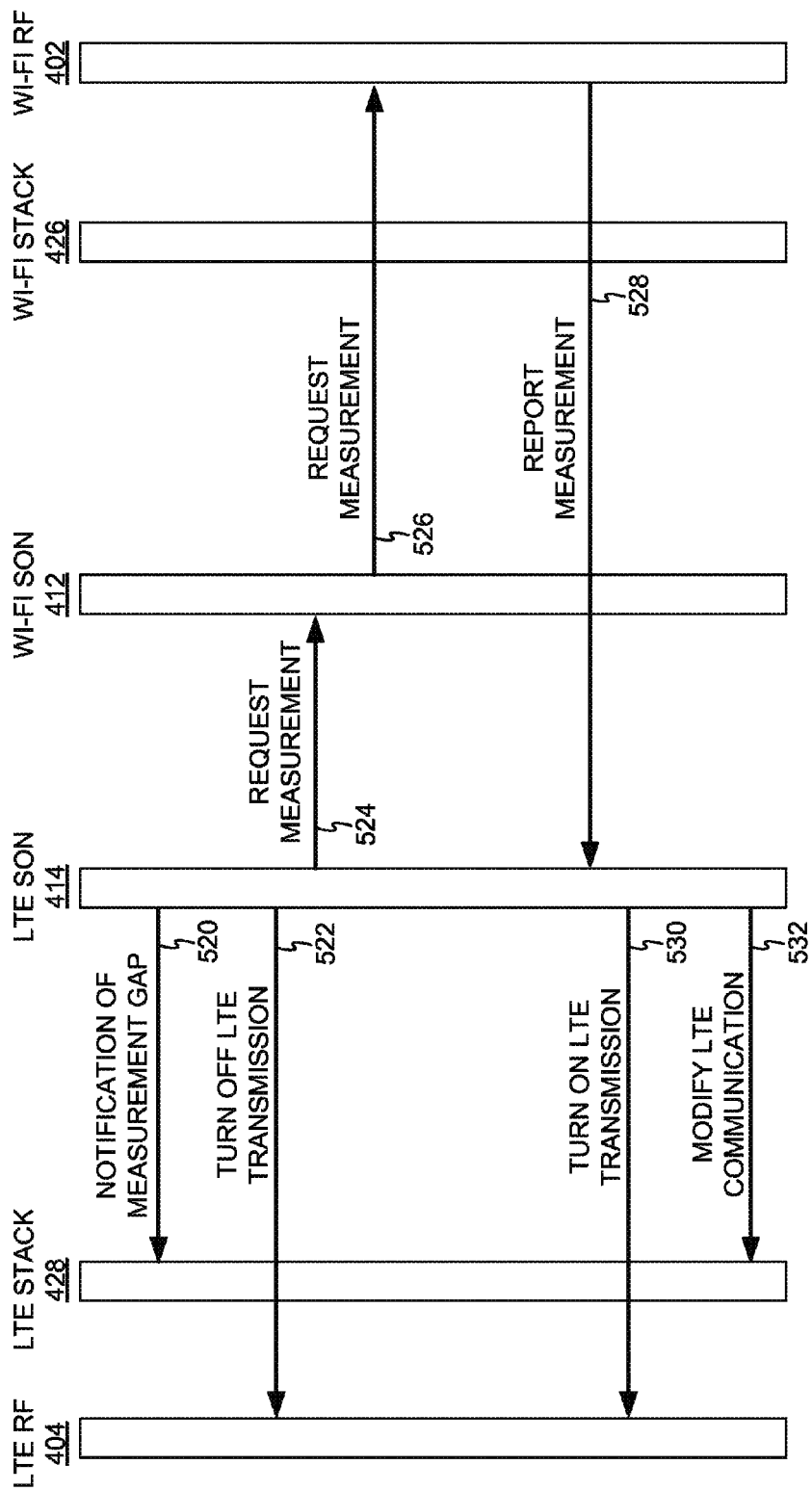
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi stack 426 and the Wi-Fi SON 412. In some instances, the measurement report may include not only measurements performed by the Wi-Fi radio 402 itself, but also measurements collected by the Wi-Fi radio 402 from the STA 450. The LTE SON 414 may then send a command 530 to cause the LTE radio 404 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400 may specially adapt different aspects of its cellular operations in order to manage co-existence between the different RATs. Returning to FIG. 5, the LTE SON 414, for example, may then send a message 532 that informs the LTE stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
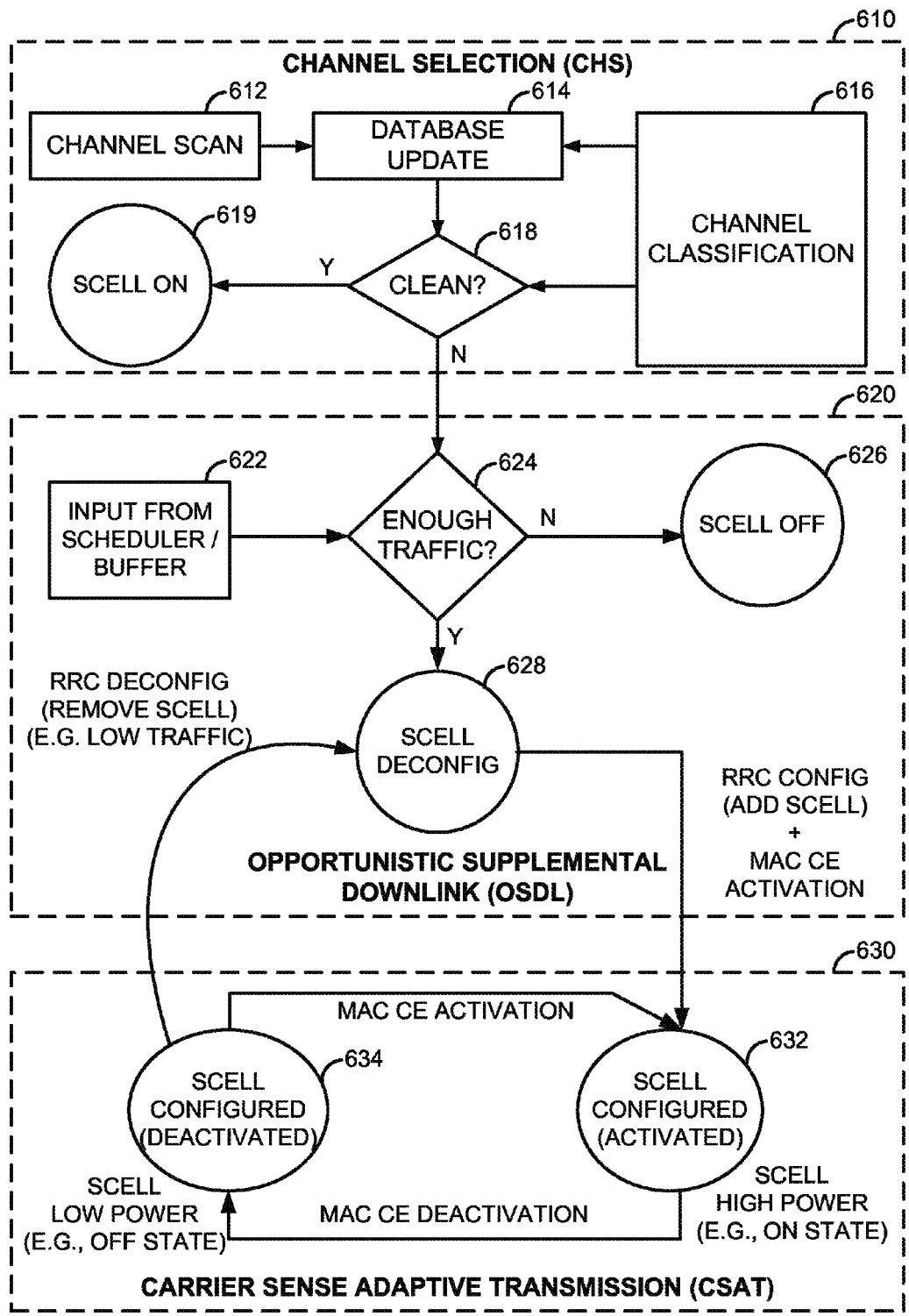
FIG. 6 is a system-level co-existence state diagram illustrating different aspects of cellular operation that may be specially adapted to manage co-existence between different RATs operating on a shared unlicensed band.

FIG. 6 is a system-level co-existence state diagram illustrating different aspects of cellular operation that may be specially adapted to manage co-existence between different RATs operating on a shared unlicensed band. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from a scheduler/buffer (block 622) to determine whether a substantial amount of traffic is being processed to warrant unlicensed operation without a clean channel being available (decision 624). If there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

Returning to FIG. 6, the SCell may be initially enabled in a deconfigured state (state 628). The SCell along with one or more corresponding user devices may then be configured and activated (state 630) for normal operation. In LTE, for example, an associated UE may be configured and deconfigured via corresponding RRC Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate at relatively high power (e.g., full powered ON state). In the configured/deactivated state (state 634), the SCell may operate at a reduced, relatively low power (e.g., depowered OFF state).

Figure 7:
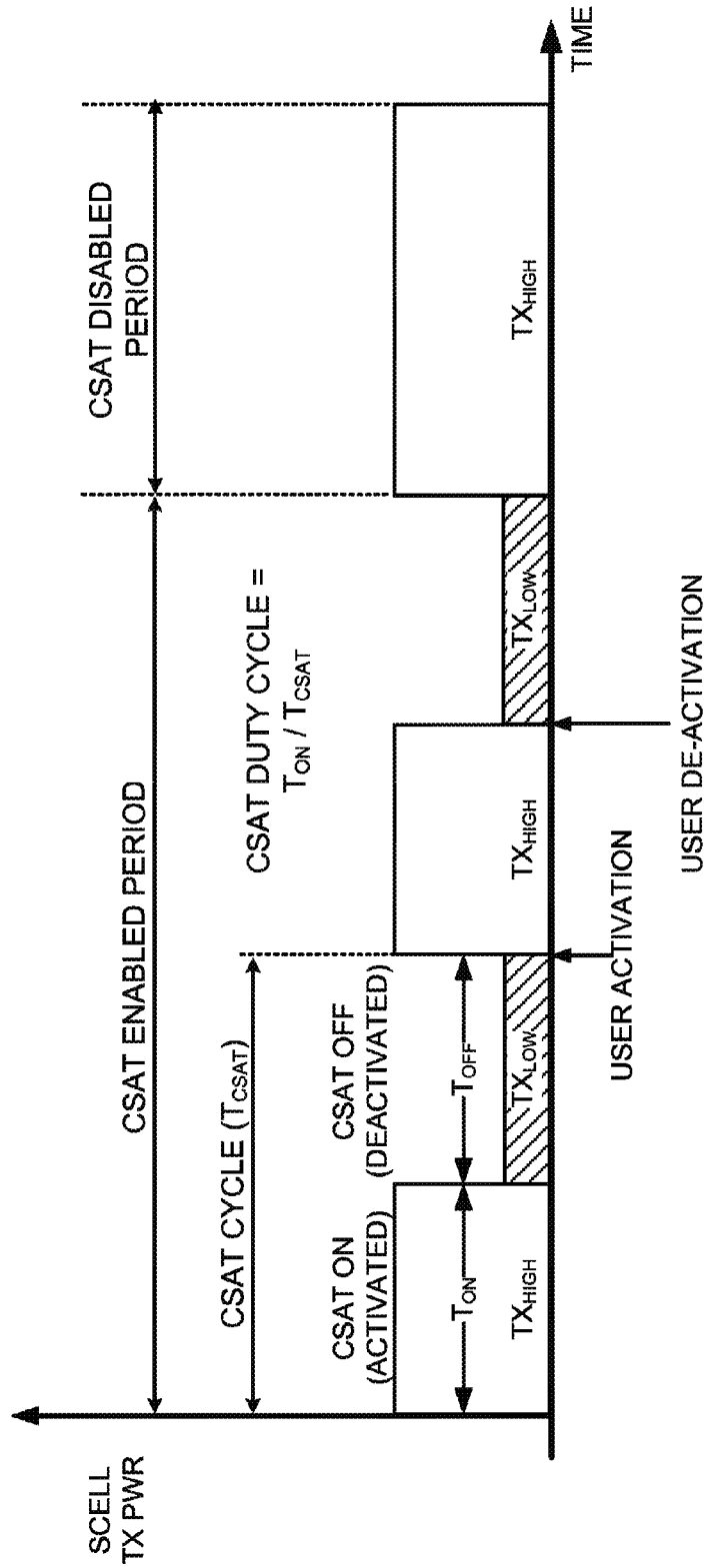
FIG. 7 illustrates in more detail certain aspects of a Carrier Sense Adaptive Transmission (CSAT) communication scheme for cycling cellular operation in accordance with a long-term Time Division Multiplexed (TDM) communication pattern.

FIG. 7 illustrates in more detail certain aspects of a CSAT communication scheme for cycling cellular operation in accordance with a long-term TDM communication pattern. As discussed above in relation to FIG. 6, CSAT may be selectively enabled on one or more SCells as appropriate to facilitate co-existence in unlicensed spectrum, even when a clean channel free of competing RAT operation is not available.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$) and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particularly in unlicensed spectrum. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, the CSAT ON (activated) period durations and transmission powers may be different, but minimum deactivation times and certain channel selection measurement gaps may be synchronized.

In practice, turning a given RAT such as LTE off during certain periods may impact the operation of the communication system. For example, a user device may attempt to perform various measurements during the CSAT OFF (deactivated) period, such as Carrier-to-Interference (C/I), Reference Signal Received Power (RSRP), Reference Signal Received Quality (RSRQ), and Channel Quality Indicator (CQI) measurements, but will not be able to find the corresponding base station during this time since the base station is turned off. This may impact measurement and timing accuracy, tracking loop procedures, cell reselection procedures, etc., and detrimentally affect proper operation of the system.

To overcome such issues, base stations (e.g., LTE small cells) may be configured to transmit certain signals during the CSAT OFF (deactivated) periods of TDM pattern communication, while refraining from transmitting other signals during those time periods. The transmitted signals may be selected to assist user devices (e.g., UEs) in maintaining proper operation during the deactivated periods, while still reducing interference to neighboring RATs (e.g., Wi-Fi). The user devices may also be configured to detect the presence of CSAT communication by certain base stations, and modify their behavior and corresponding procedures accordingly.

Figure 8:
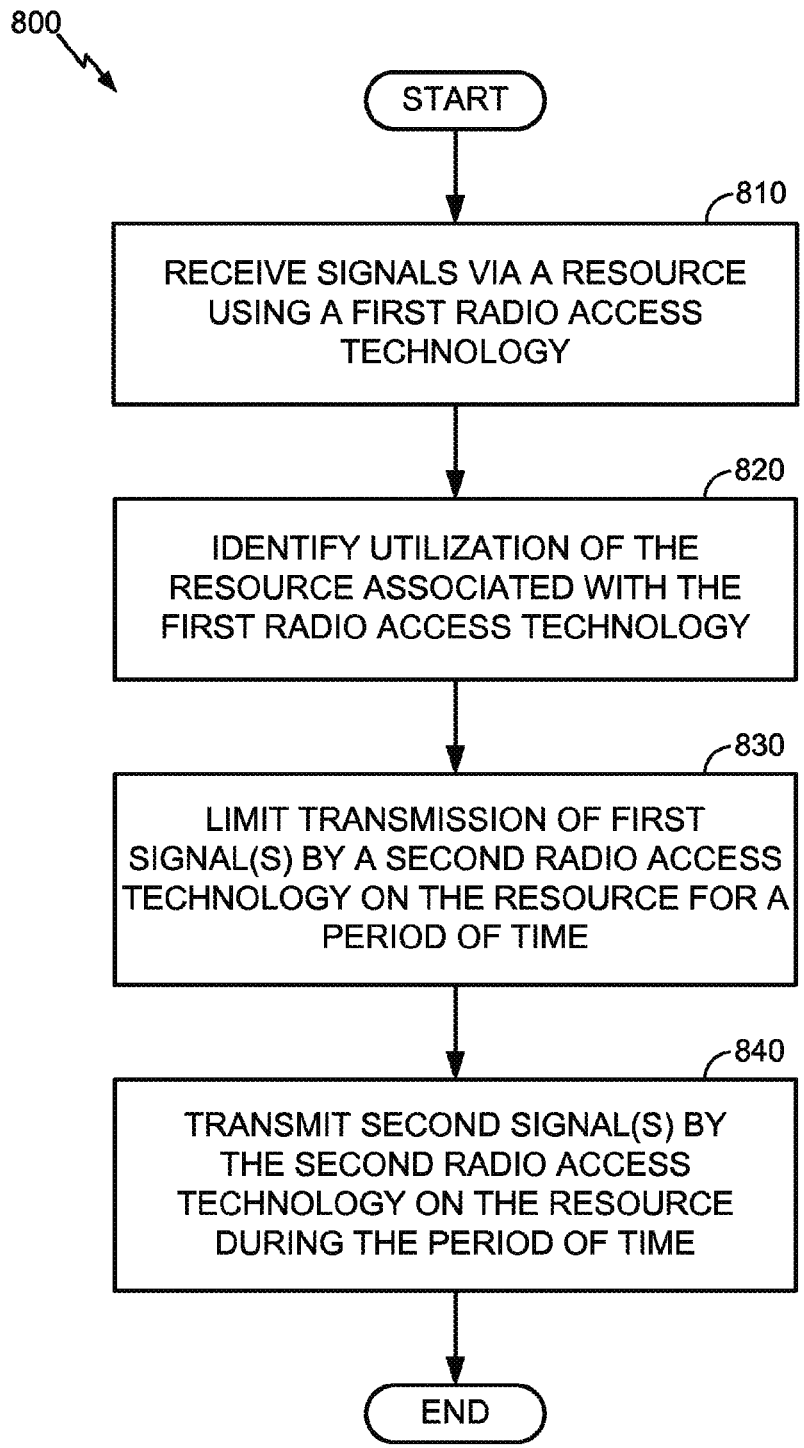
FIG. 8 is a flow diagram illustrating an example method of CSAT communication for reducing interference between radio access technologies.

FIG. 8 is a flow diagram illustrating an example method of CSAT communication for reducing interference between RATs. The method 500 may be performed, for example, by a base station (e.g., the small cell base station 110B illustrated in FIG. 1).

As shown, the method 800 may include the base station receiving signals via a resource using a first (e.g., Wi-Fi) RAT (block 810). The resource may be an unlicensed radio frequency band shared by Wi-Fi and LTE devices, for example. The base station may then identify utilization of the resource associated with the first RAT based on the received signals (block 820). Utilization of the resource may give an indication of an amount of interference (e.g., co-channel interference).

In response, the base station may limit transmission of at least a first signal or set of signals by a second RAT (e.g., LTE) on the resource for a period of time based on the identified utilization of the resource (block 830), while continuing to transmit a second signal or set of signals by the second RAT on the resource during that period of time (block 840). The signal or set of signals being limited may be selected to reduce interference to the first RAT, while the transmitted signal or set of signals may be selected to assist user devices (e.g., UEs) in maintaining proper operation during the deactivated periods. In general, the period of time for such a signaling scheme may be associated with an adaptable duty cycle used for the CSAT communication as discussed above, and in particular with a deactivated period thereof to retain the advantages of duty cycle adaptation while still providing certain reference signaling that may be useful for the user devices.

As an example, the signal or set of signals that continue to be transmitted during the deactivated periods may include a Primary Synchronization Signal (PSS) or a Secondary Synchronization Signal (SSS) of the type described above with reference to FIG. 2. PSS/SSS synchronization signals are generally low duty cycle and narrow band, and may therefore be used to assist the user device in keeping accurate timing information (i.e., reducing clock drift) with only minimal interference to other radio access technologies on the shared medium. Meanwhile, other signals, such as or including a Cell-specific Reference Signal (CRS) of the type described above with reference to FIG. 2, may be limited or turned completely off during the deactivated periods. As discussed in more detail above, the deactivated periods may be associated with an adaptable TDM pattern used for the CSAT communication, and the limited signals will therefore be transmitted at other times during activated periods.

Figure 9:
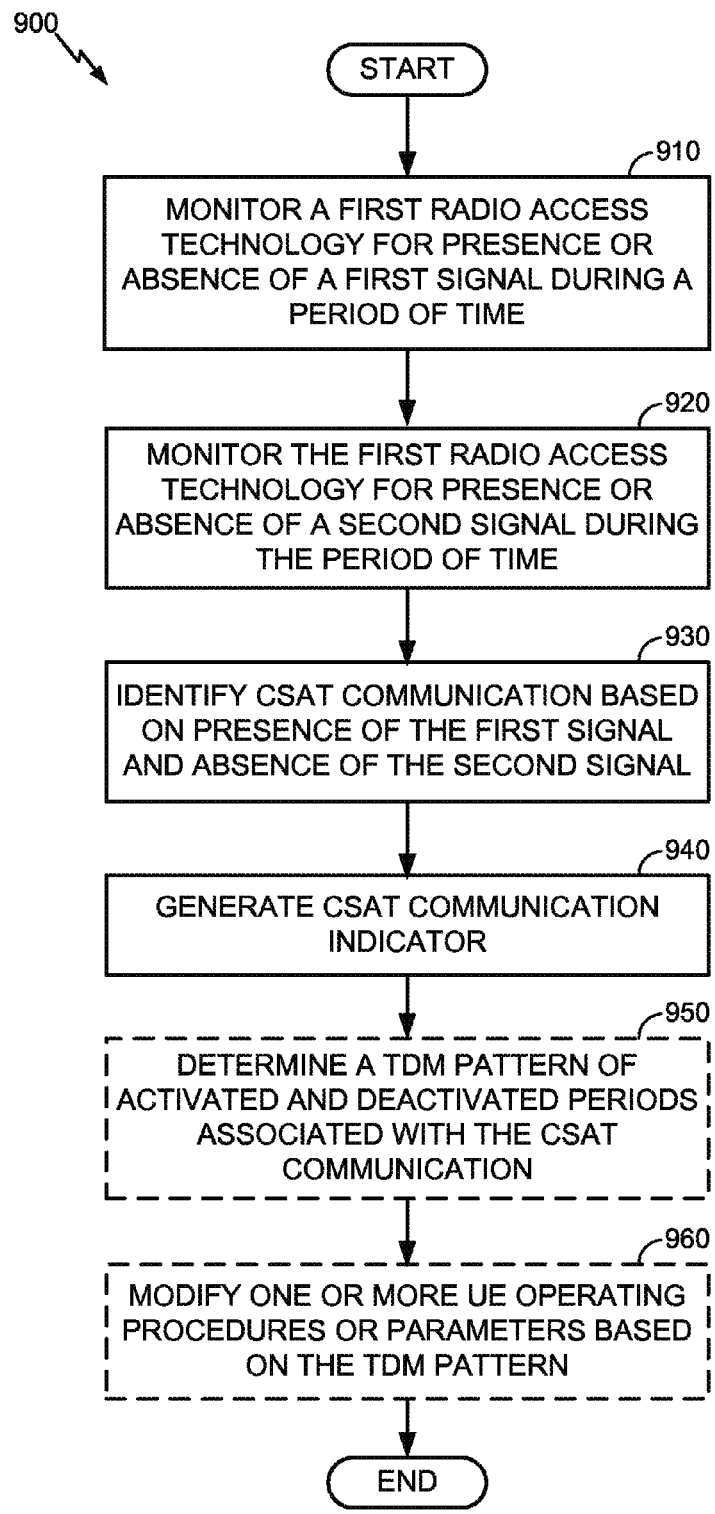
FIG. 9 is a flow diagram illustrating an example method of identifying CSAT communication for reducing interference between radio access technologies

FIG. 9 is a flow diagram illustrating an example method of identifying CSAT communication for reducing interference between RATs. The method 900 may be performed, for example, by a user device (e.g., the user device 120C illustrated in FIG. 1).

As shown, the method 900 may include the user device (e.g., UE) monitoring a first RAT (e.g., LTE) for presence or absence of a first signal (e.g., PSS/SSS) during a period of time (block 910). The user device may also monitor the first RAT for presence or absence of a second signal (e.g., CRS) during the same period of time (block 910). Presence or absence of the first and second signals may be determined, for example, according to one or more signal strength thresholds.

As discussed above, a base station performing CSAT communication may be configured to transmit some signals (e.g., PSS/SSS) but not others (e.g., including CRS) during deactivated periods. Accordingly, based on presence of the first signal and absence of the second signal, for example, the user device may be able to identify that CSAT communication is being performed by the base station (block 930).

In response to detecting the presence of CSAT communication by a base station, the user device may be configured to generate a CSAT communication indicator (block 940).

The CSAT communication indicator may be used in a variety of ways, and may prompt the user device to take appropriate investigative, remedial, or other action. For example, the user device may determine a TDM pattern of activated and deactivated periods associated with the CSAT communication (optional block 950), and modify one or more operating procedures or parameters based on the TDM pattern (optional block 960). The TDM pattern determination may include, for example, determining a periodicity of the presence of the second signal, and determining a duty cycle for the TDM pattern based on the periodicity.

In one example, the user device may ignore signal power or quality (e.g., RSRP) measurements during the deactivated period as these may not be accurate due to the CSAT communication scheme. Instead, the user device may only use measurements from the activated periods (e.g., when both PSS/SSS and CRS have a detection SNR within a specified range). As another example, the user device may use, for a deactivated period, the signal power or quality (e.g., RSRP/RSRQ) measurements from a preceding (e.g., most recent) activated period.

As another example, the user device may align its search window with the TDM pattern, which may help to conserve power by avoiding searching in the deactivated periods. As another example, the user device may reuse timing information from a first (e.g., prior) activated period to ramp up a Time Tracking Loop (TTL) in a second (e.g., later) activated period. The TTL allows for a correct starting point of a Fast Fourier Transform (FFT) window to optimize receiver gain when decoding received signals.

As another example, the user device may change one or more filter coefficients used in different parameter estimation loops based on the TDM pattern (e.g., to modify the passband of a modem filter to exclude certain signal energy during the deactivated periods).

Figure 10:
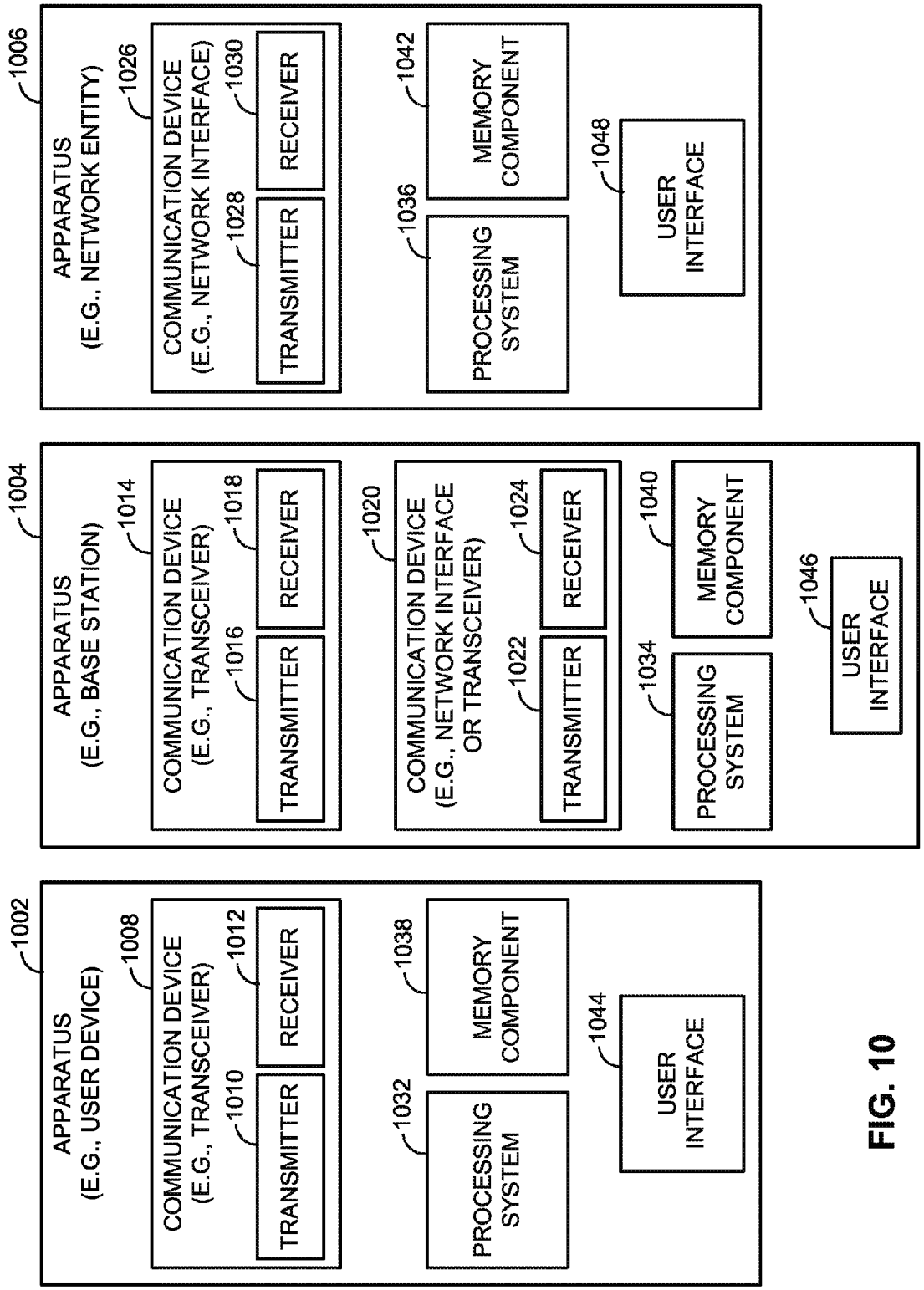
FIG. 10 is a simplified block diagram of several sample aspects of components that may be employed in communication nodes and configured to support communication as taught herein.

FIG. 10 illustrates several sample components (represented by corresponding blocks) that may be incorporated into an apparatus 1002, an apparatus 1004, and an apparatus 1006 (corresponding to, for example, a user device, a base station, and a network entity, respectively) to support the CSAT identification and mitigation operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1002 and the apparatus 1004 each include at least one wireless communication device (represented by the communication devices 1008 and 1014 (and the communication device 1020 if the apparatus 1004 is a relay)) for communicating with other nodes via at least one designated RAT. Each communication device 1008 includes at least one transmitter (represented by the transmitter 1010) for transmitting and encoding signals (e.g., messages, indications, information, and so on) and at least one receiver (represented by the receiver 1012) for receiving and decoding signals (e.g., messages, indications, information, pilots, and so on). Similarly, each communication device 1014 includes at least one transmitter (represented by the transmitter 1016) for transmitting signals (e.g., messages, indications, information, pilots, and so on) and at least one receiver (represented by the receiver 1018) for receiving signals (e.g., messages, indications, information, and so on). If the apparatus 1004 is a relay station, each communication device 1020 may include at least one transmitter (represented by the transmitter 1022) for transmitting signals (e.g., messages, indications, information, pilots, and so on) and at least one receiver (represented by the receiver 1024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1004 may also comprise a Network Listen Module (NLM) or the like for performing various measurements.

The apparatus 1006 (and the apparatus 1004 if it is not a relay station) includes at least one communication device (represented by the communication device 1026 and, optionally, 1020) for communicating with other nodes. For example, the communication device 1026 may comprise a network interface that is configured to communicate with one or more network entities via a wire-based or wireless backhaul. In some aspects, the communication device 1026 may be implemented as a transceiver configured to support wire-based or wireless signal communication. This communication may involve, for example, sending and receiving: messages, parameters, or other types of information. Accordingly, in the example of FIG. 10, the communication device 1026 is shown as comprising a transmitter 1028 and a receiver 1030. Similarly, if the apparatus 1004 is not a relay station, the communication device 1020 may comprise a network interface that is configured to communicate with one or more network entities via a wire-based or wireless backhaul. As with the communication device 1026, the communication device 1020 is shown as comprising a transmitter 1022 and a receiver 1024.

The apparatuses 1002, 1004, and 1006 also include other components that may be used in conjunction with the CSAT identification and mitigation operations as taught herein. The apparatus 1002 includes a processing system 1032 for providing functionality relating to, for example, CSAT identification and mitigation as taught herein and for providing other processing functionality. The apparatus 1004 includes a processing system 1034 for providing functionality relating to, for example, CSAT identification and mitigation as taught herein and for providing other processing functionality. The apparatus 1006 includes a processing system 1036 for providing functionality relating to, for example, CSAT identification and mitigation as taught herein and for providing other processing functionality. The apparatuses 1002, 1004, and 1006 include memory components 1038, 1040, and 1042 (e.g., each including a memory device), respectively, for maintaining information (e.g., information indicative of reserved resources, thresholds, parameters, and so on). In addition, the apparatuses 1002, 1004, and 1006 include user interface devices 1044, 1046, and 1048, respectively, for providing indications (e.g., audible and/or visual indications) to a user and/or for receiving user input (e.g., upon user actuation of a sensing device such a keypad, a touch screen, a microphone, and so on).

For convenience, the apparatuses 1002, 1004, and/or 1006 are shown in FIG. 10 as including various components that may be configured according to the various examples described herein. It will be appreciated, however, that the illustrated blocks may have different functionality in different designs.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1008, 1032, 1038, and 1044 may be implemented by processor and memory component(s) of the apparatus 1002 (e.g., by execution of appropriate code and/or by appropriate configuration of processor components). Similarly, some or all of the functionality represented by blocks 1014, 1020, 1034, 1040, and 1046 may be implemented by processor and memory component(s) of the apparatus 1004 (e.g., by execution of appropriate code and/or by appropriate configuration of processor components). Also, some or all of the functionality represented by blocks 1026, 1036, 1042, and 1048 may be implemented by processor and memory component(s) of the apparatus 1006 (e.g., by execution of appropriate code and/or by appropriate configuration of processor components).

Figure 11:
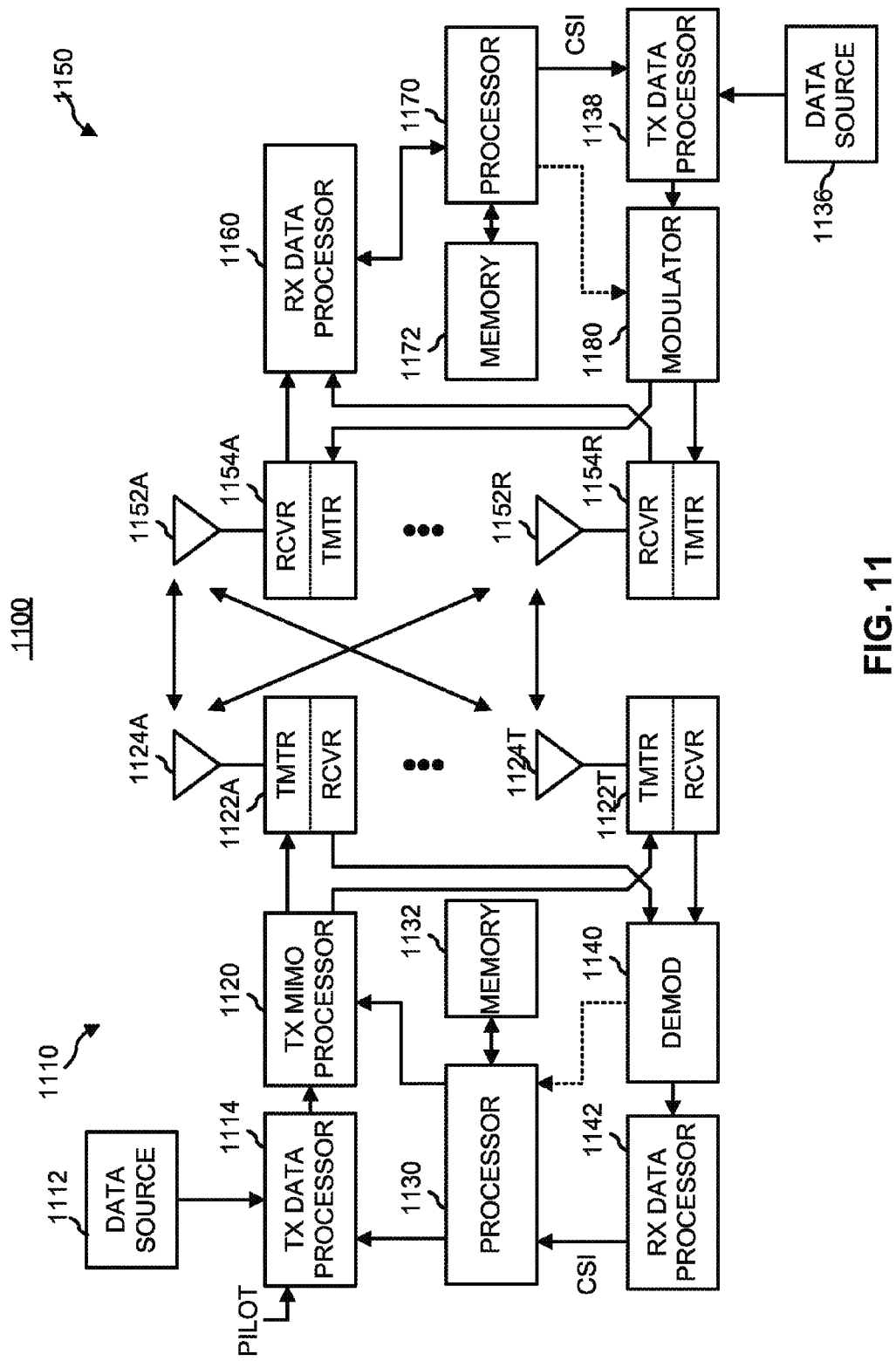
FIG. 11 is another simplified block diagram of several sample aspects of communication components that may be configured to support communication as taught herein.

FIG. 11 illustrates in more detail a processor and memory based design of components for a wireless device 1110 (e.g., a base station) and a wireless device 1150 (e.g., a user device) in a communication system 1100 that may be configured as described herein. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX Multiple-Input-Multiple-Output (MIMO) processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1130, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will also be appreciated that the various communication components illustrated in FIG. 11 and described above may be further configured as appropriate to perform CSAT identification and mitigation as taught herein. For example, the processor 1130 may cooperate with the memory 1132 and/or other components of the device 1110 to perform the CSAT identification and mitigation as taught herein. Similarly, the processor 1170 may cooperate with the memory 1172 and/or other components of the device 1150 to perform the CSAT identification and mitigation as taught herein.

Figure 12:
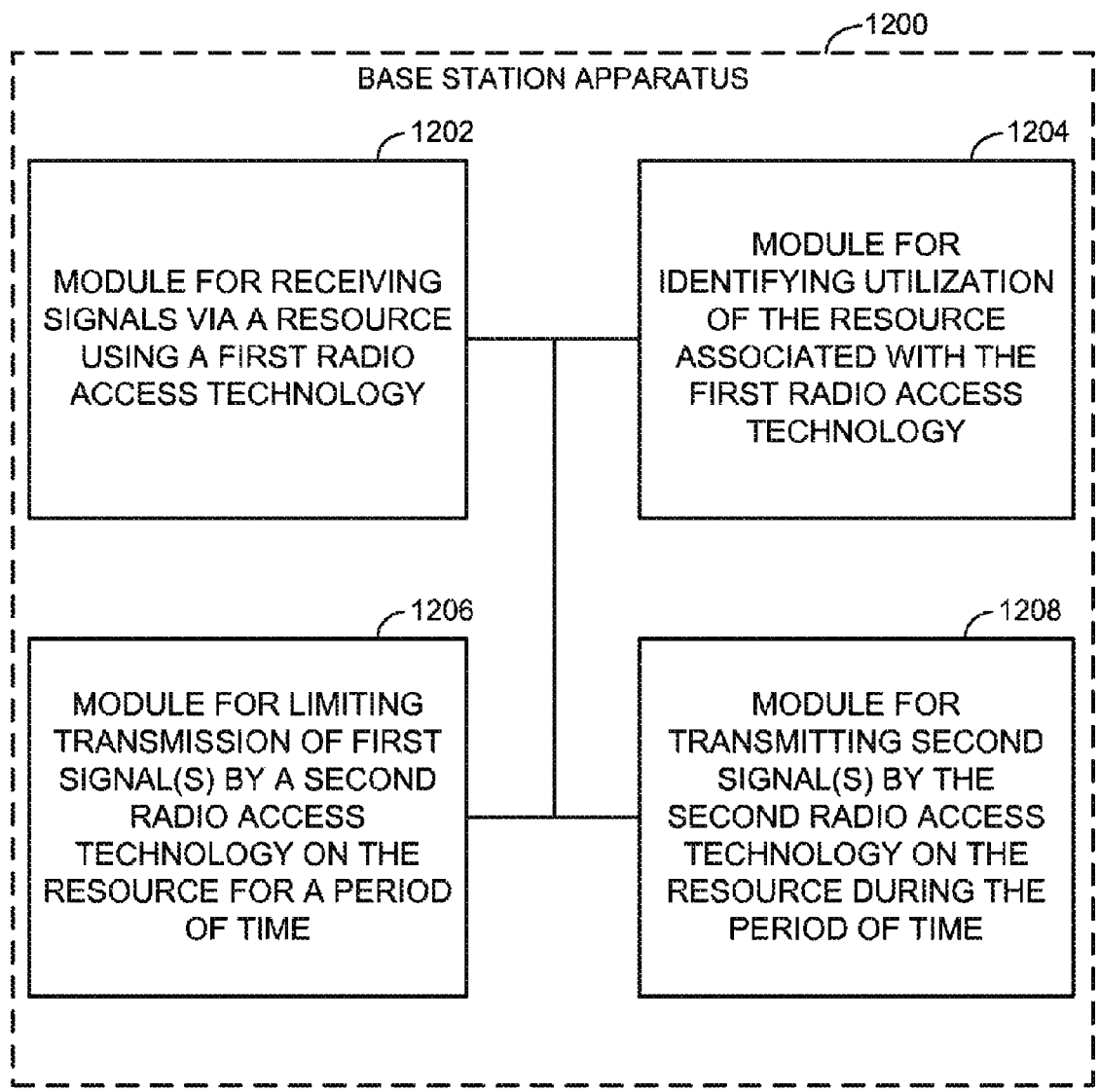
FIGS. 12 and 13 are still other simplified block diagrams of several sample aspects of apparatuses configured to support communication as taught herein.

FIG. 12 illustrates an example base station apparatus 1200 represented as a series of interrelated functional modules. A module for receiving 1202 may correspond at least in some aspects to, for example, a communication device as discussed herein. A module for identifying 1204 may correspond at least in some aspects to, for example, a processing system as discussed herein. A module for limiting 1206 may correspond at least in some aspects to, for example, a processing system in conjunction with a communication device as discussed herein. A module for transmitting 1208 may correspond at least in some aspects to, for example, a processing system in conjunction with a communication device as discussed herein.

Figure 13:
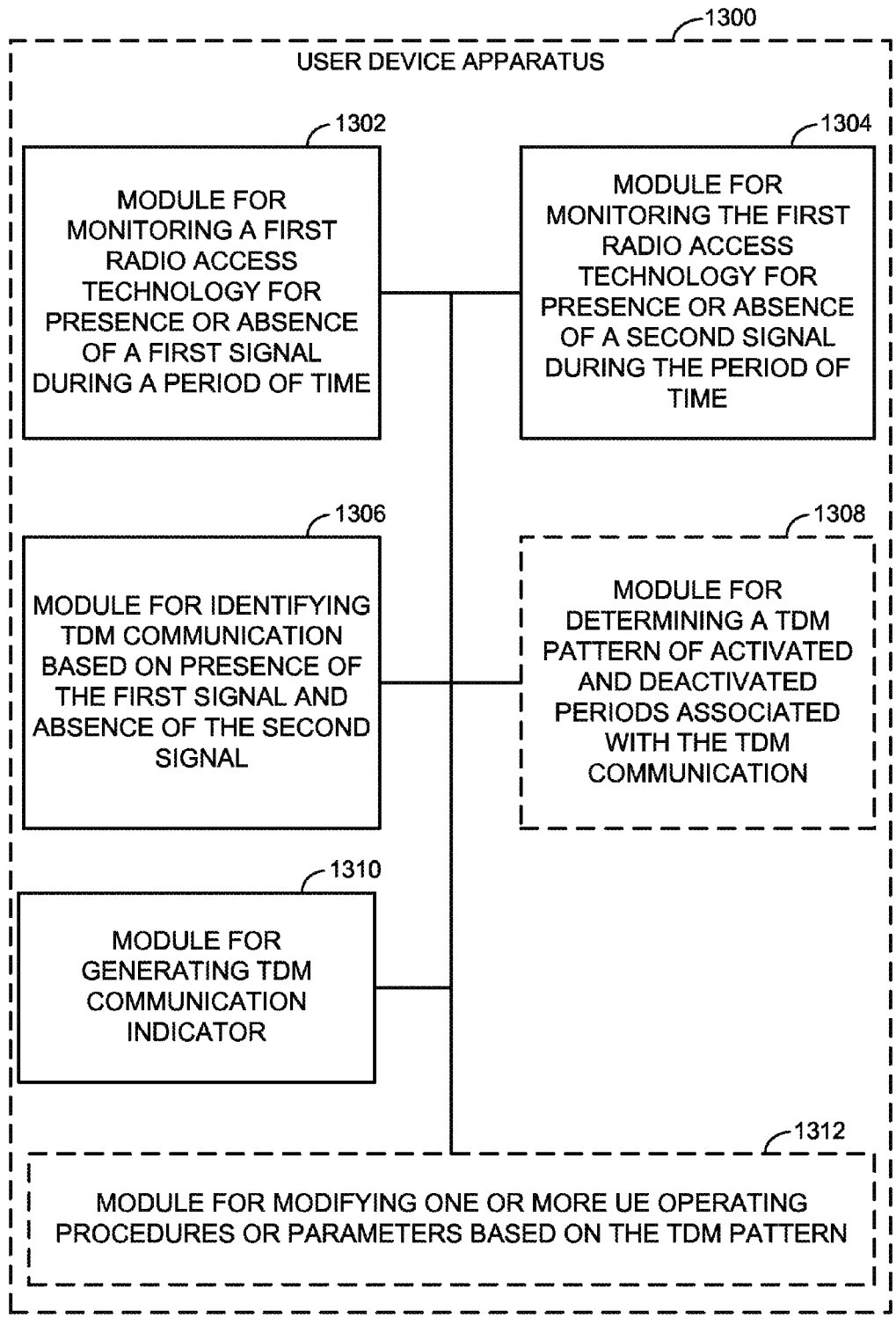

FIG. 13 illustrates an example user device apparatus 1300 represented as a series of interrelated functional modules. A module for monitoring 1302 may correspond at least in some aspects to, for example, a communication device as discussed herein. A module for monitoring 1304 may correspond at least in some aspects to, for example, a communication device as discussed herein. A module for identifying 1306 may correspond at least in some aspects to, for example, a processing system as discussed herein. A module for determining 1308 may correspond at least in some aspects to, for example, a processing system as discussed herein. A module for generating 1310 may correspond at least in some aspects to, for example, a processing system as discussed herein. A module for modifying 1312 may correspond at least in some aspects to, for example, a processing system as discussed herein.

The functionality of the modules of FIGS. 12-13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 12-13, as well as other components and functions described herein, may be implemented using any suitable means. Such means also may be implemented, at least in part, using corresponding structure as taught herein. For example, the components described above in conjunction with the "module for" components of FIGS. 12-13 also may correspond to similarly designated "means for" functionality. Thus, in some aspects one or more of such means may be implemented using one or more of processor components, integrated circuits, or other suitable structure as taught herein.

Figure 14:
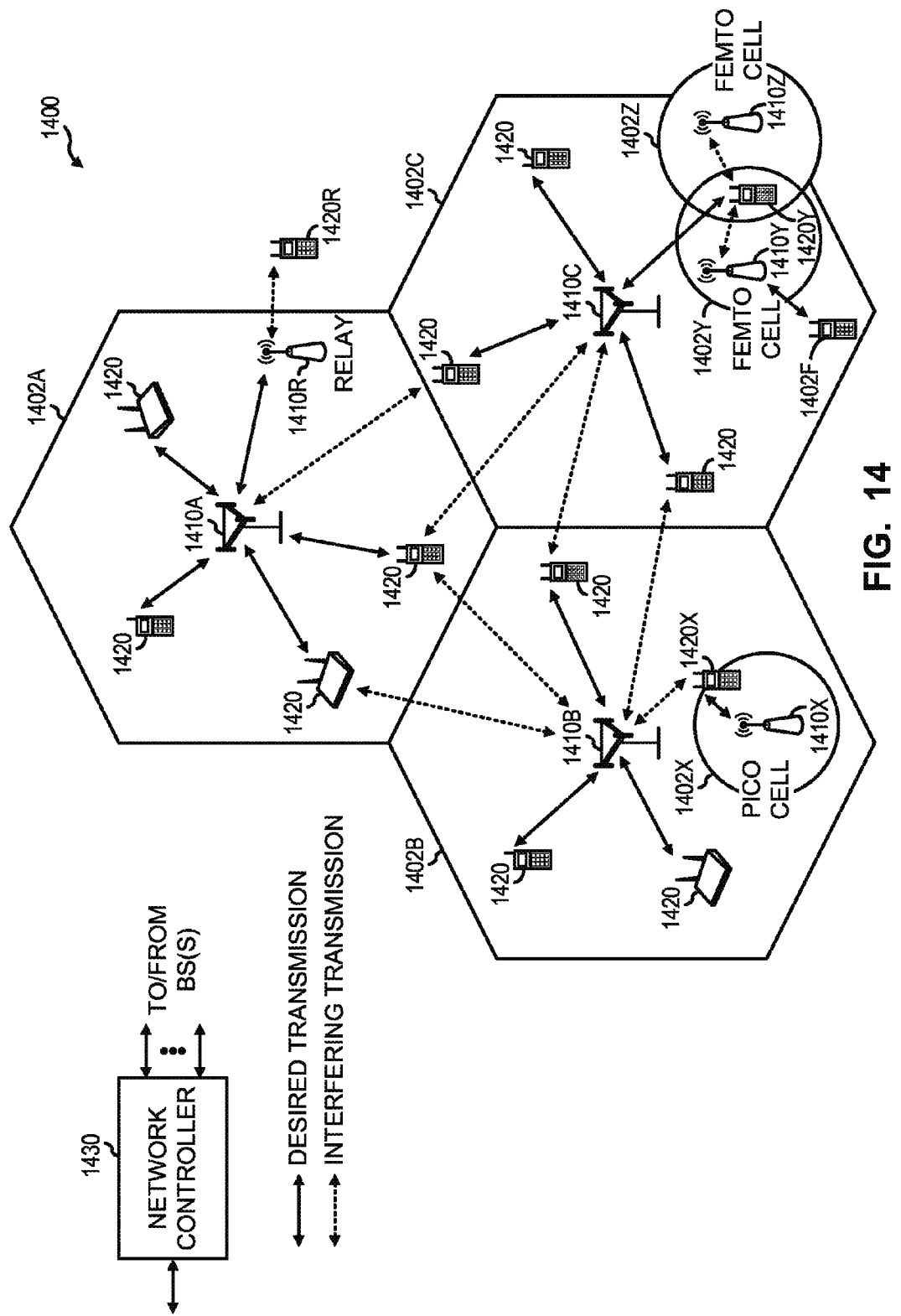
FIG. 14 illustrates an example communication system environment in which the teachings and structures herein may be incorporated.

FIG. 14 illustrates an example communication system environment in which the teachings and structures herein may be incorporated. The wireless communication system 1400, which will be described at least in part as an LTE network for illustration purposes, includes a number of eNBs 1410 and other network entities. Each of the eNBs 1410 provides communication coverage for a particular geographic area, such as macro cell or small cell coverage areas.

In the illustrated example, the eNBs 1410A, 1410B, and 1410C are macro cell eNBs for the macro cells 1402A, 1402B, and 1402C, respectively. The macro cells 1402A, 1402B, and 1402C may cover a relatively large geographic area (e.g., several kilometers in radius) and may allow unrestricted access by UEs with service subscription. The eNB 1410X is a particular small cell eNB referred to as a pico cell eNB for the pico cell 1402X. The pico cell 1402X may cover a relatively small geographic area and may allow unrestricted access by UEs with service subscription. The eNBs 1410Y and 1410Z are particular small cells referred to as femto cell eNBs for the femto cells 1402Y and 1402Z, respectively. The femto cells 1402Y and 1402Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 1400 also includes a relay station 1410R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 14, the relay station 1410R communicates with the eNB 1410A and a UE 1420R in order to facilitate communication between the eNB 1410A and the UE 1420R. A relay station may also be referred to as a relay eNB, a relay, etc.

The wireless network 1400 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 1400. For example, macro eNBs may have a relatively high transmit power level whereas pico eNBs, femto eNBs, and relays may have a lower transmit power level (e.g., by a relative margin, such as a 10 dBm difference or more).

Returning to FIG. 14, the wireless network 1400 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1430 may couple to a set of eNBs and provide coordination and control for these eNBs. The network controller 1430 may communicate with the eNBs 1410 via a backhaul. The eNBs 1410 may also communicate with one another, e.g., directly or indirectly via a wireless or wireline backhaul.

As shown, the UEs 1420 may be dispersed throughout the wireless network 1400, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 14, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1420Y may be in proximity to femto eNBs 1410Y, 1410Z. Uplink transmissions from UE 1420Y may interfere with femto eNBs 1410Y, 1410Z. Uplink transmissions from UE 1420Y may jam femto eNBs 1410Y, 1410Z and degrade the quality of reception of other uplink signals to femto eNBs 1410Y, 1410Z.

Small cell eNBs such as the pico cell eNB 1410X and femto eNBs 1410Y, 1410Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1410Y may be an open-access femto eNB with no restricted associations to UEs. The femto eNB 1410Z may be a higher transmission power eNB initially deployed to provide coverage to an area. Femto eNB 1410Z may be deployed to cover a large service area. Meanwhile, femto eNB 1410Y may be a lower transmission power eNB deployed later than femto eNB 1410Z to provide coverage for a hotspot area (e.g., a sports arena or stadium) for loading traffic from either or both eNB 1410C, eNB 1410Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for CSAT communication for reducing interference between RATs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of identifying Carrier Sense Adaptive Transmission (CSAT) communication for reducing interference between Radio Access Technologies (RATs), comprising:
   monitoring a first RAT for presence or absence of a first signal associated with operation of the first RAT during a period of time;
   monitoring the first RAT for presence or absence of a second signal associated with operation of the first RAT during the period of time;
   identifying the period of time as being part of a deactivated period of CSAT communication based on a presence of the first signal and an absence of the second signal during the period of time; and
   generating a CSAT communication indicator based on the identification.

2. The method of claim 1, wherein the presence or absence of the first and second signals is based on one or more signal strength thresholds.

3. The method of claim 1, wherein the first signal is a Primary Synchronization Signal (PSS) or a Secondary Synchronization Signal (SSS), and wherein the second signal is a Cell-specific Reference Signal (CRS).

4. The method of claim 1, wherein the first RAT corresponds to a Long Term Evolution (LTE) system operating on an unlicensed radio frequency band associated with operation of a second RAT.

5. The method of claim 1, wherein the CSAT communication comprises a cycling of activated and deactivated periods of operation of the first RAT.

6. The method of claim 1, further comprising:
determining a Time Division Multiplexed (TDM) pattern of activated and deactivated periods associated with the CSAT communication in response to the CSAT communication indicator; and
modifying one or more operating procedures or parameters of a User Equipment (UE) based on the TDM pattern.

7. The method of claim 6, wherein the determining comprises:
determining a periodicity of the presence of the second signal; and
determining a duty cycle for the TDM pattern based on the periodicity.

8. The method of claim 6, wherein the modifying comprises at least one of (i) ignoring signal power or quality measurements during the deactivated period or (ii) using, for a deactivated period, signal power or quality measurements from a preceding activated period.

9. The method of claim 6, wherein the modifying comprises at least one of (i) aligning a search window of the UE with the TDM pattern or (ii) reusing timing information from a first activated period to ramp up a Time Tracking Loop (TTL) in a second activated period.

10. The method of claim 6, wherein the modifying comprises changing filter coefficients used in one or more parameter estimation loops of the UE based on the TDM pattern.

11. An apparatus for identifying Carrier Sense Adaptive Transmission (CSAT) communication for reducing interference between Radio Access Technologies (RATs), comprising:
a transceiver configured to monitor a first RAT for presence or absence of a first signal associated with operation of the first RAT during a period of time, and to monitor the first RAT for presence or absence of a second signal associated with operation of the first RAT during the period of time;
at least one processor; and
at least one memory coupled to the at least one processor, the at least one processor and the at least one memory being configured to identify the period of time as being part of a deactivated period of CSAT communication based on a presence of the first signal and an absence of the second signal during the period of time, and to generate a CSAT communication indicator based on the identification.

12. The apparatus of claim 11, wherein the presence or absence of the first and second signals is based on one or more signal strength thresholds.

13. The apparatus of claim 11, wherein the first signal is a Primary Synchronization Signal (PSS) or a Secondary Synchronization Signal (SSS), and wherein the second signal is a Cell-specific Reference Signal (CRS).

14. The apparatus of claim 11, wherein the first RAT corresponds to a Long Term Evolution (LTE) system operating on an unlicensed radio frequency band associated with operation of a second RAT.

15. The apparatus of claim 11, wherein the CSAT communication comprises a cycling of activated and deactivated periods of operation of the first RAT.

16. The apparatus of claim 11, wherein the at least one processor and the at least one memory are further configured to:
determine a Time Division Multiplexed (TDM) pattern of activated and deactivated periods associated with the CSAT communication in response to the CSAT communication indicator; and
modify one or more operating procedures or parameters of a User Equipment (UE) based on the TDM pattern.

17. The apparatus of claim 16, wherein the at least one processor and the at least one memory are configured to determine the TDM pattern by:
determining a periodicity of the presence of the second signal; and
determining a duty cycle for the TDM pattern based on the periodicity.

18. The apparatus of claim 16, wherein the at least one processor and the at least one memory are configured to modify the one or more operating procedures or parameters by at least one of (i) ignoring signal power or quality measurements during the deactivated period or (ii) using, for a deactivated period, signal power or quality measurements from a preceding activated period.

19. The apparatus of claim 16, wherein the at least one processor and the at least one memory are configured to modify the one or more operating procedures or parameters by at least one of (i) aligning a search window of the UE with the TDM pattern or (ii) reusing timing information from a first activated period to ramp up a Time Tracking Loop (TTL) in a second activated period.

20. The apparatus of claim 16, wherein the at least one processor and the at least one memory are configured to modify the one or more operating procedures or parameters by changing filter coefficients used in one or more parameter estimation loops of the UE based on the TDM pattern.

21. A method of Carrier Sense Adaptive Transmission (CSAT) communication for reducing interference between Radio Access Technologies (RATs), comprising:
transmitting a first signal by a second RAT on the resource during an activated period of an adaptable duty cycle used for the CSAT communication;
receiving signals via a resource, wherein a first RAT is used to receive the signals;
identifying utilization of the resource associated with the first RAT, wherein the identification is based on the received signals;
limiting transmission of at least the first signal by the second RAT on the resource for a period of time that is part of a deactivated period of the adaptable duty cycle used for the CSAT communication, wherein the limiting is based on the identified utilization of the resource; and
transmitting a second signal by the second RAT on the resource during the period of time.

22. The method of claim 21, wherein the CSAT communication comprises a Time Division Multiplexed (TDM) pattern of activated and deactivated periods of operation of the second RAT.

23. The method of claim 21, wherein the first signal is a Cell-specific Reference Signal (CRS), and wherein the second signal is a Primary Synchronization Signal (PSS) or a Secondary Synchronization Signal (SSS).

24. The method of claim 21, wherein the resource is an unlicensed radio frequency band.

25. The method of claim 21, wherein:
the first RAT comprises Wi-Fi technology; and
the second RAT comprises Long Term Evolution (LTE) technology.

26. An apparatus for Carrier Sense Adaptive Transmission (CSAT) communication for reducing interference between Radio Access Technologies (RATs), comprising:
- a first transceiver configured to receive signals via a resource, wherein a first RAT is used to receive the signals;
- at least one processor;
- at least one memory coupled to the at least one processor, the at least one processor and the at least one memory being configured to identify utilization of the resource associated with the first RAT, wherein the identification is based on the received signals, and to limit transmission of at least a first signal by a second RAT on the resource for a period of time that is part of a deactivated period of an adaptable duty cycle used for the CSAT communication, wherein the limiting is based on the identified utilization of the resource; and
- a second transceiver configured to transmit a second signal by the second RAT on the resource during the period of time,
- wherein the second transceiver is further configured to transmit the first signal by the second RAT on the resource during an activated period of the adaptable duty cycle used for the CSAT communication.

27. The apparatus of claim 26, wherein the CSAT communication comprises a Time Division Multiplexed (TDM) pattern of activated and deactivated periods of operation of the second RAT.

28. The apparatus of claim 26, wherein the first signal is a Cell-specific Reference Signal (CRS), and wherein the second signal is a Primary Synchronization Signal (PSS) or a Secondary Synchronization Signal (SSS).

29. The apparatus of claim 26, wherein the resource is an unlicensed radio frequency band.

30. The apparatus of claim 26, wherein:
- the first RAT comprises Wi-Fi technology; and
- the second RAT comprises Long Term Evolution (LTE) technology.

\* \* \* \* \*